United States Patent [19]
Frost

[11] 3,973,672
[45] Aug. 10, 1976

[54] ARTICLE CONVEYING AND ORIENTING APPARATUS
[75] Inventor: Lawrence Frost, Cahokia, Ill.
[73] Assignee: Alvey Inc., St. Louis, Mo.
[22] Filed: May 28, 1975
[21] Appl. No.: 574,612

[52] U.S. Cl. .............................. 198/283; 198/31 AA
[51] Int. Cl.[2] ......................................... B65G 47/14
[58] Field of Search ......... 198/31 R, 31 AA, 31 AB, 198/31 AC, 32, 263, 264, 266, 283; 193/35 SS, 36

[56] References Cited
UNITED STATES PATENTS

| | | | |
|---|---|---|---|
| 1,853,787 | 4/1932 | Twomley | 198/32 |
| 2,816,646 | 12/1957 | Stocking | 198/31 AA |
| 2,873,836 | 2/1959 | Stubblefield | 198/31 AC |
| 2,978,092 | 4/1961 | Phillips et al. | 198/32 |
| 3,058,570 | 10/1962 | Hansen | 198/31 AA |
| 3,138,238 | 6/1964 | DeGood et al. | 193/36 |
| 3,262,538 | 7/1966 | Englander | 198/31 AC |
| 3,272,298 | 9/1966 | Cato | 198/31 AC |
| 3,580,379 | 5/1971 | Shuster | 198/31 AB |
| 3,642,113 | 2/1972 | Burgis | 198/127 R |
| 3,738,644 | 6/1973 | Kluge et al. | 198/31 R |
| R25,673 | 11/1964 | Burt | 198/31 AA |

Primary Examiner—John J. Love
Assistant Examiner—Richard K. Thomson
Attorney, Agent, or Firm—Gravely, Lieder & Woodruff

[57] ABSTRACT

Article conveying and orienting apparatus adapted to receive articles in single file order and convey the articles into either of two side by side article conveying paths by means of friction wheels programmed to engage articles fed into the apparatus and orient the articles for subsequent movement into either of the article conveying paths.

5 Claims, 7 Drawing Figures

ARTICLE CONVEYING AND ORIENTING APPARATUS

BRIEF SUMMARY OF THE INVENTION

This invention relates to article conveying and orienting apparatus and is particularly concerned with the rapid handling of a supply of articles so as to orient the articles into separate paths for further conveyance.

The general objects of the present invention are to provide apparatus of relatively uncomplicated cooperating components which will operate to handle the output from a single high speed production line and orient the articles into separate paths for further conveyance, to provide unique article engaging and orient components which may be programmed for alternating article orientation if desired, and to provide an organization of components embodied in a multi-path power conveyor which will selectively orient and arrange the high speed flow of articles into separate paths for further conveyance.

It is a particularly important object of the present invention to provide apparatus of the foregoing character which may be programmed to receive a succession of articles from a feed conveyor and direct them into predetermined conveyor paths, and in the directing of the articles into a given conveyor path and at the same time orienting the respective articles by turning them ninety degrees during the travel. The apparatus may also be programmed to alternate in directing articles into the different conveyor paths from a common supply conveyor and to turn the respective articles during the travel into either of the conveying paths.

A preferred embodiment of present apparatus is constructed to include roller conveyors in side by side relation to establish article conveying paths in substantially the same plane, means to supply articles toward the conveying paths, means between the supply of articles and conveying paths to engage and selectively or continually orient articles for further movement into the conveying paths, and means to regulate the operation of the foregoing to accomplish the general purpose of orienting articles moving between a single file supply conveyor and subsequent article conveying paths.

The herein above generally defined article conveying and orienting apparatus is shown in the accompanying drawings in connection with components which will perform the necessary handling of articles in an economical and substantially trouble free manner.

DETAILED DESCRIPTION OF THE EMBODIMENT

Figure 1:
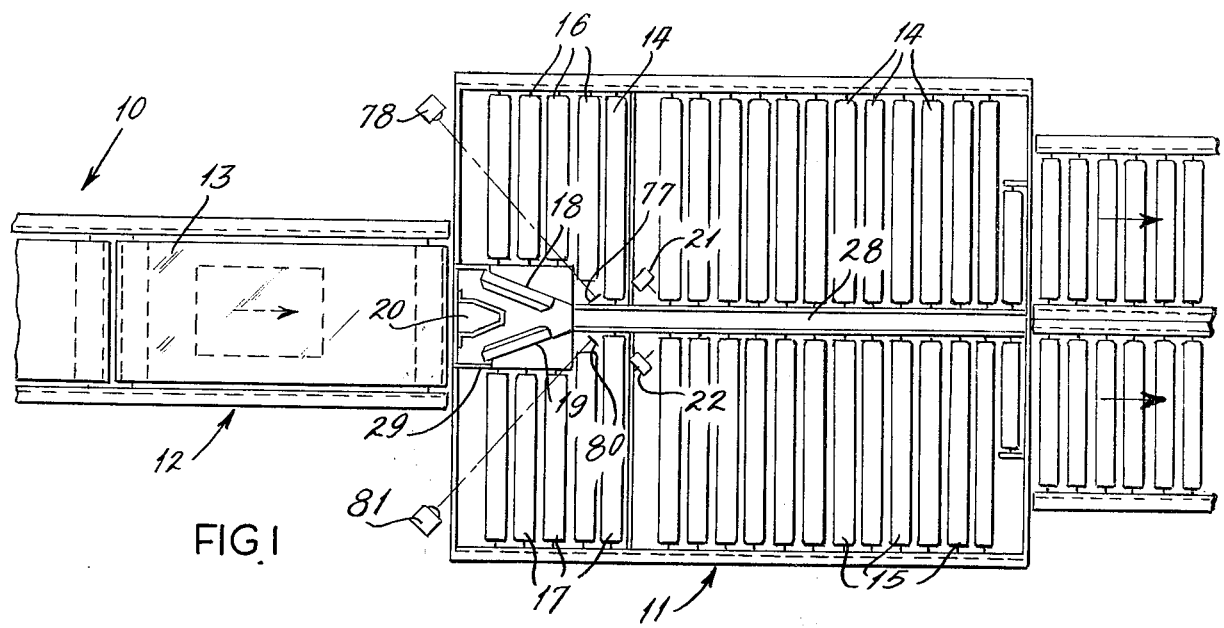
FIG. 1 is a schematic plan view of the apparatus according to the presently preferred embodiment thereof.

Reference will now be made to the views of FIGS. 1 and 2 wherein the present apparatus is seen to include a single relatively high speed conveyor line 10 directed toward the present apparatus 11, but interrupted by a conveyor section 12 in the form of a belt 13 which may be speed controlled for the purpose of spacing the articles delivered thereto by the conveyor 10. The apparatus 11 consists of conveyor rollers 14 making up one conveyor path, and a second group of conveyor rollers 15 making up a second path. There is an article receiving section in the apparatus 11 which is constituted by a first series of rollers 16 generally aligned with the rollers 14 in the first mentioned path, and rollers 17 in this same section generally aligned with the rollers 15. This arrangement of rollers 16 and 17 in the receiving section of the apparatus 11 is combined with a pair of article steering wheels 18 and 19 disposed between the inboard ends of the rollers 16 and 17 and in alignment with the discharge end of the conveyor belt 13. These wheels 18 and 19 are spaced apart and are angularly canted, for a purpose to be described presently. The space therebetween is occupied by a dead plate 20 to prevent small size articles from dipping into the space between the wheels which would be otherwise left unprotected. The rollers 14 in the first mentioned conveying path are provided, downstream from the wheel 18, with a small friction roller 21 which revolves about an axis generally directed forwardly into the oncoming articles at an angle of approximately 40° to the longitudinal axis of rollers 14. The rollers 15 in the second mentioned path are likewise provided with a small fraction roller 22 which is arranged to rotate about an axis diverging from the axis of the first mentioned roller 21 so as to be at an angle of approximately 40° to the axis of the rollers 15. Each of these rollers 21 and 22 has its upper surface raised slightly above the plane of the respective rollers 14 and 15 so as to be engaged by the under surfaces of articles that may be directed to move over the same.

Figure 3:
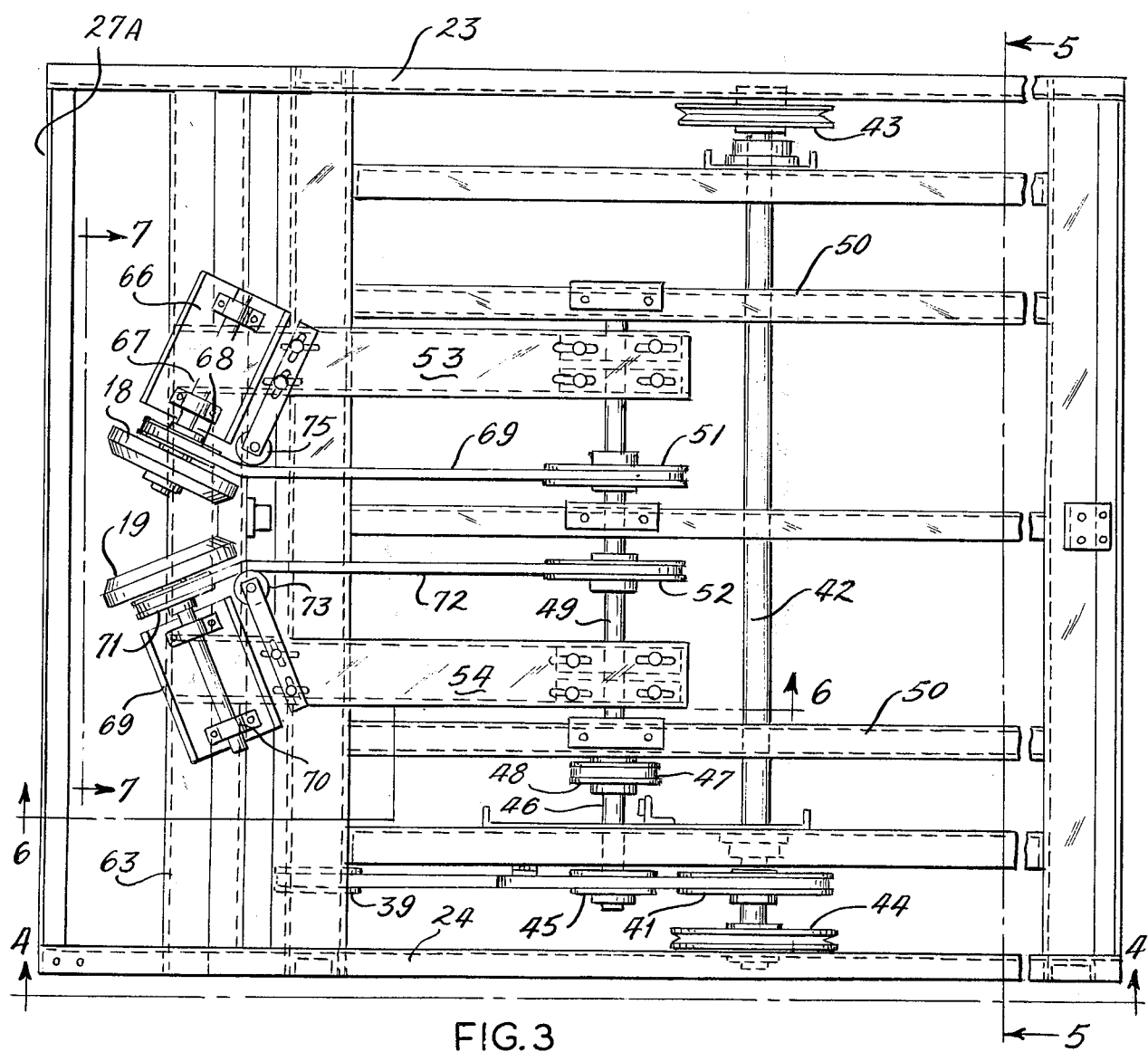
FIG. 3 is a further fragmentary plan view of the present apparatus showing further details of the construction with the conveying rollers of FIG. 2 removed so as to show underlying details.
Figure 2:
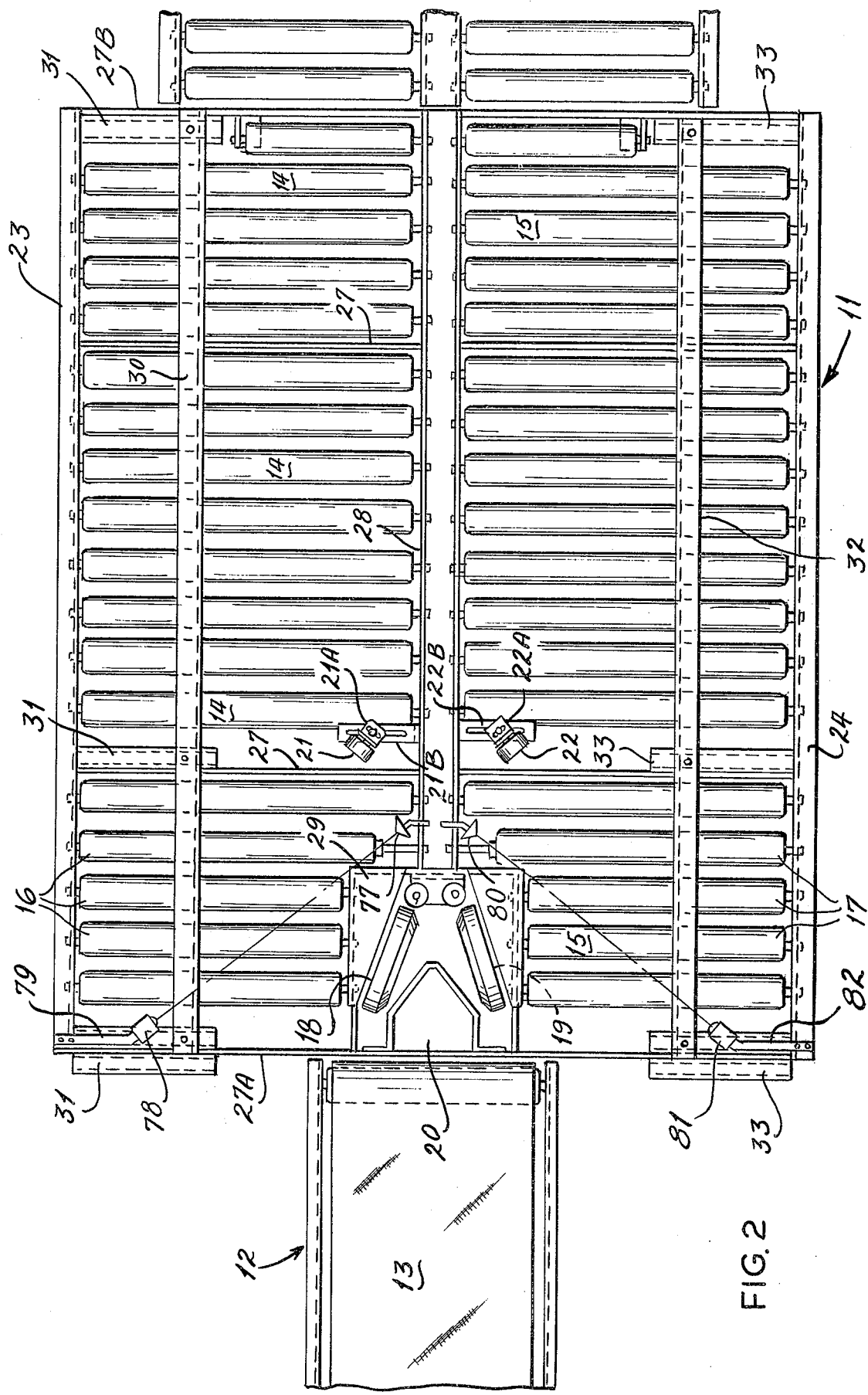
FIG. 2 is an enlarged and fragmentary plan view of certain components of the present apparatus.

More specifically in FIGS. 2 and 3 the apparatus 11 includes a suitable frame having outer longitudinal side members 23 and 24 which are supported (FIGS. 4 and 5) on underlying channel members 25 and 26 respectively. These frame side members are cross connected by spacer members 27, of which member 27A is at the article supply end and 27B is at the article discharge end. A longitudinal channel 28 is incorporated to run parallel to the side upper members 23 and 24 so as to divide the distance between these side members equally. The member 28 acts as a separator between the respective array of rollers 14 and 15, and with the side members 23 and 24 supports the respective shafts upon which the rollers 14 and 15 are mounted. The member 28 extends toward the conveyor belt 13 and provides support for a frame 29 which defines an opening between the rollers 16 and 17 in the receiving section of the apparatus 11, and this opening is occupied by the steering wheels 18 and 19 and the dead plate 20.

There is shown in FIG. 2 adjustable side guides for each of the roller conveyor paths. For example, the path defined by the rollers 14 may be adjusted as to its operating width by a side guide 30 which is supported on a plurality of brackets which are fastened to the adjacent side member 23 and project inwardly to provide three spaced points of support for the side guide. In a similar manner, an opposite side guide 32 extends longitudinally of the side member 24 and is supported inwardly thereof by brackets 33 so as to permit adjustment of the side guide 32. The respective side guide 30 and 32 are spaced from the centrally located member 28 so that the first path of article conveyance is formed between member 28 and the guide 30, and the second mentioned article conveying path is formed between the member 28 and side guide 32.

Figure 4:
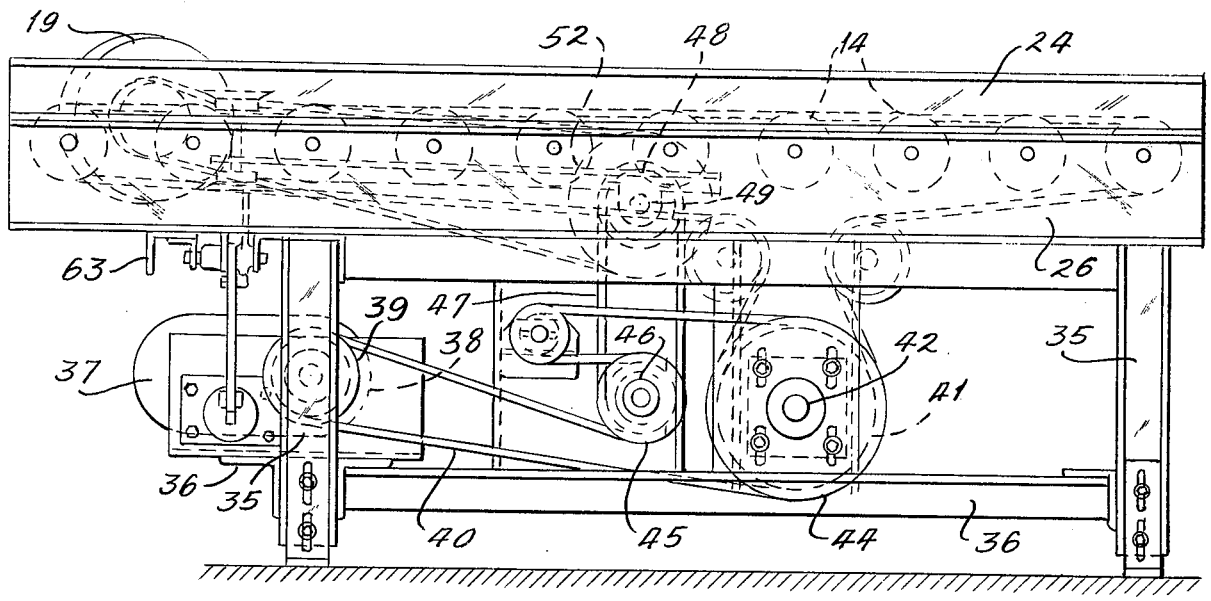
FIG. 4 is a longitudinal elevational view taken along line 4—4 in FIG. 3.
Figure 5:
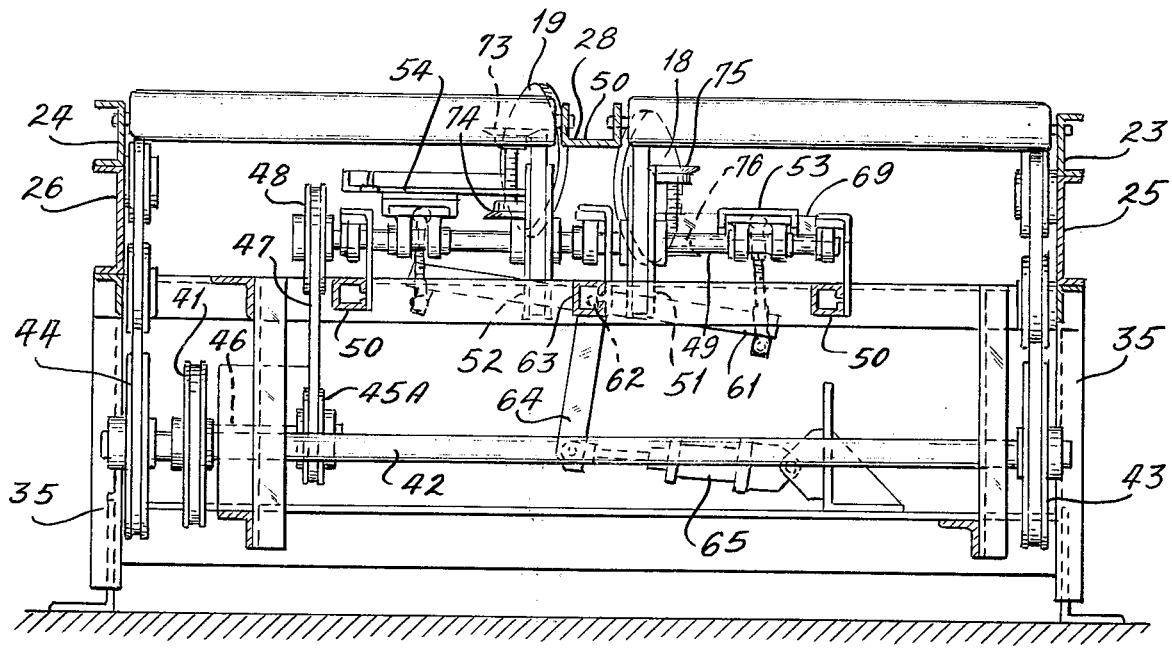
FIG. 5 is an end elevational view taken along line 5—5 in FIG. 3.
Figure 6:
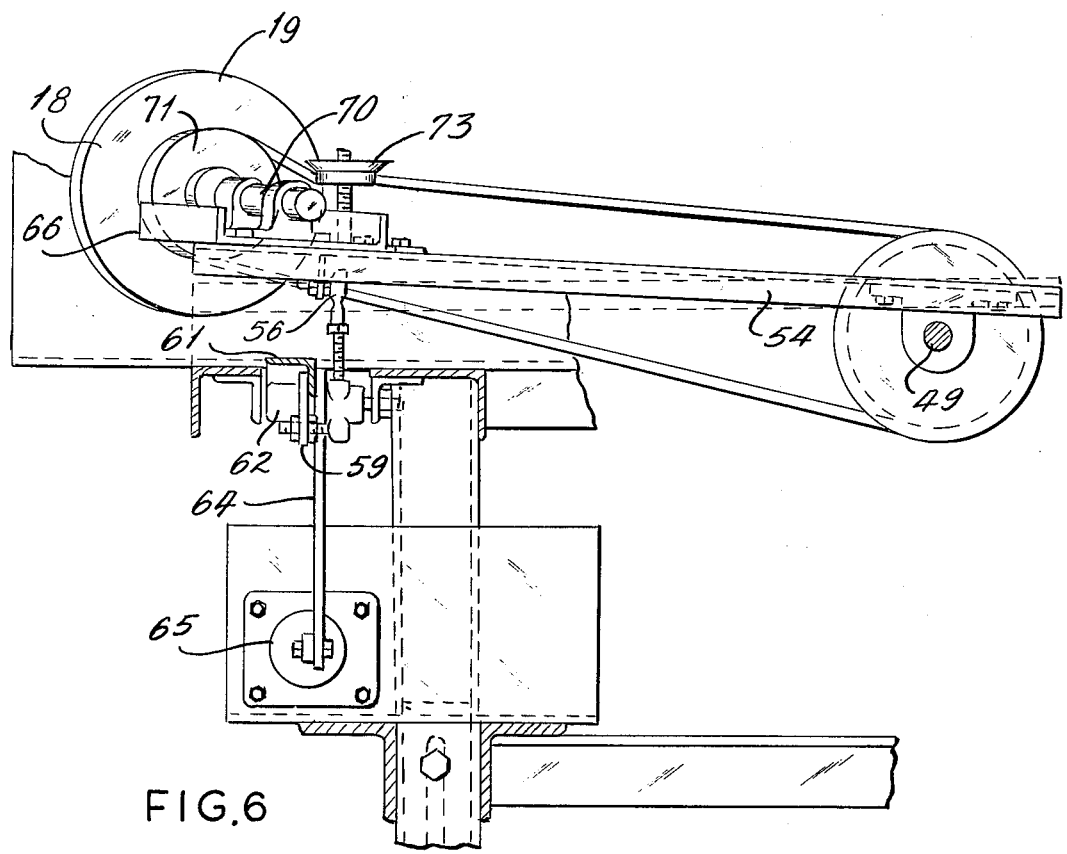
FIG. 6 is a fragmentary longitudinal view taken along FIG. 6—6 in FIG. 3.

Turning now to FIGS. 4 and 5 it is seen that the side member 24 is carried on a supporting channel 26 which, in turn, is mounted on legs 35. While not shown in detail, the opposite side member 23 is similarly supported on member 25 for the purpose of furnishing support for the assembly of drive and operating mechanism which will now be described. The respective legs 35 located under the receiving section of the apparatus 11 support a frame 36 which carries a drive motor 37 which operates a reduction gear unit 38 for driving a power output pulley 39. The pulley 39 is connected by a suitable V-belt 40 to a pulley 41 which is fast on a cross shaft 42 which extends from side to side and is mounted in the understructure carried by the members 25 and 26 which also support the side members 23 and 24. The shaft 42 is provided on its opposite ends with pulley 43 and 44 which are provided to drive the rollers 14 and 15, as well as certain of the rollers 16 and 17 in the receiving section of the apparatus 11. The V-belt 40 is wrapped around a pulley 45 (FIGS. 3 and 4) which is fast on a short shaft 46, and a second pulley 45A on shaft 46 drives a belt 47 engaged with a pulley 48 on an upper cross shaft 49 supported at its opposite end in suitable longitudinal beams 50. The shaft 49 carries a pair of pulleys 51 and 52 which will be described presently.

Figure 7:
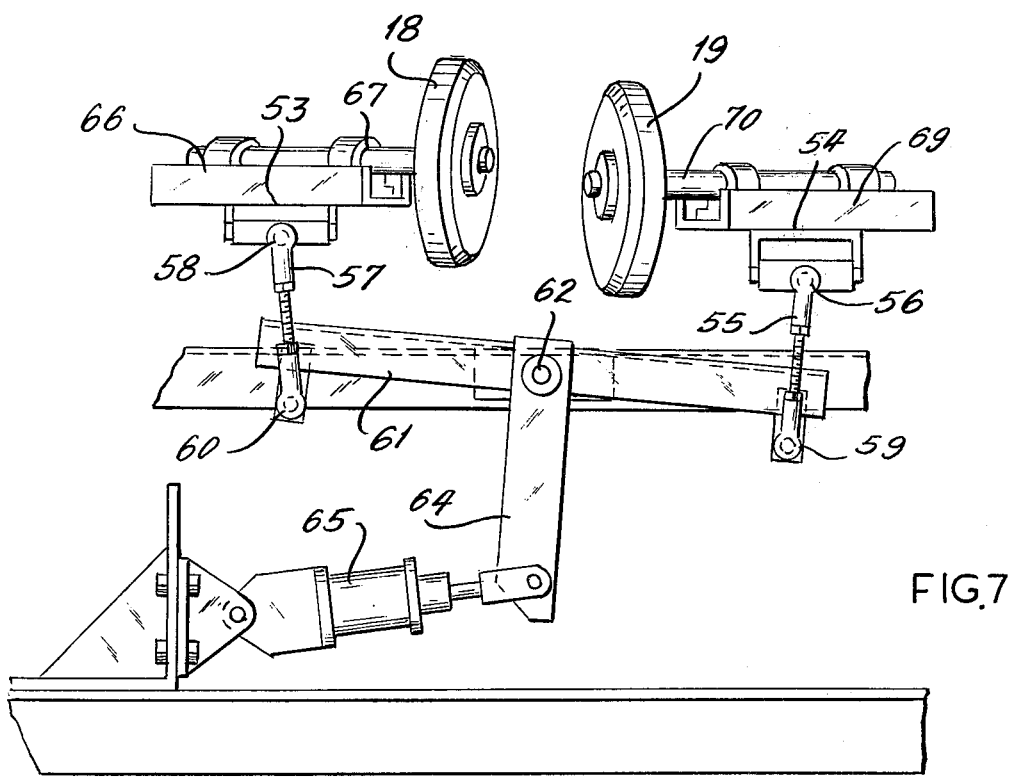
FIG. 7 is a fragmentary end elevational view as seen along line 7—7 in FIG. 3.

It can be seen in FIGS. 3 to 7 that the upper shaft 49 is utilized to support radius arms 53 and 54 which extend into the receiving section of the apparatus. The forward end of the radius arm 54, as shown in FIG. 7, is supported on the upper end of a push rod 55 by means of a pivot 56 having an axis generally parallel to the lengthwise axis of the radius arm 54. The opposite radius arm 53 is similarly supported on a push rod 57 which is connected by a pivot 58 having its axis generally parallel to the lengthwise axis of the arm 53. The respective push rods 55 and 57 have the lower ends thereof pivotly carried by brackets 59 and 60, the brackets being in turn fixed on the outer ends of a rocker arm 61. The rocker arm 61 is supported on a centrally deposed pivot 62 supported by a transverse angle iron 63 which is best seen in FIG. 3 and FIG. 4. The rocker arm 61 is provided with a depending actuating lever 64 by which the ends of the rocker arm 61 may be selectively rocked up and down to swing the radius arms 53 and 54 up and down about their ends supported on the cross shaft 49. A suitable air cylinder type motor means 65 is connected to the actuating lever 64 for effecting drive thereof.

Referring now to FIG. 3 it can be seen that the forward end of the radius arm 53 carries a suitable bracket plate 66 which furnishes the support for a shaft 67 on which the steering wheel 18 is made fast, and the shaft 67 also supports a pulley 68 which is connected by a V-belt 69 to the pulley 51. Similarly, the radius arm 54 carries a bracket plate 69 for the operative support of a shaft 70 which carries the steering wheel 19 and adjacent pulley 71 which is connected by a V-belt 72 to the pulley 52 fast on shaft 49. The V-belt 72 is made to depart from a straight line path at a point adjacent steering wheel 19 by a pair of guide wheels 73 and 74 best seen in FIG. 5. In a similar manner the V-belt 69 which powers the steering wheel 18 is made to deviate from a straight line path by a similar pair of guide wheels which are seen in FIG. 3 at 75 and 76. Accordingly, when the motor means 65 (FIG. 7) is actuated to rock the lever 64 back and forth and thereby rock the arm 61 in a vertical plane, the radius arm 53 and 54 are rocked vertically about the shaft 49 (FIG. 3) to effect alternate elevation and depression of the steering wheels 18 and 19. This alternating elevation and depression of the wheels 18 and 19 is accomplished while maintaining a positive drive thereof by the belts 69 and 72. The vertical motion of arms 53 and 54, and the slight arcuate motion of the ends of the rocker arm 61 transverse to the path of arms 53 and 54 is accommodated by the push rods 55 and 57.

The drive of the wheels 18 and 19 is carried on simultaneously with the drive of the rollers 14 and 15 upon starting the motor 37. The power supplied to the article conveying rollers 14 and 15, and the actuating of motor means 65, is independent of the drive for the article supply conveyor 10 and the belt 13 in the conveyor section 12. However, these drives are coordinated so that articles may be fed to the apparatus 11 and smoothly and rapidly steered onto the rollers 14 in one path, or the rollers 15 in a second path, or the articles conveyed to either path exclusively of the other.

Reference is now made to FIGS. 1 and 2 where it can be seen that the friction roller 21 is mounted at one side of the longitudinal separator member 28 and in a space between a roller 14 and a cross member 27 in the conveyor frame. More specifically, the roller 21 has its supporting bracket 21A adjustable mounted in a second bracket 21B attached to the separator member 28. Thus, the bracket 21A may be moved in and out on the bracket 21B so as to place the roller 21 in a desired position of alignment with the steering wheel 19. In like manner the friction roller 22 is mounted in a bracket 22A adjustable supported in a bracket 22B secured to the side of the separator member 28. This roller 22 is deposed in the space between a conveying roller 15 and the frame cross member 27 so as to be in cooperative alignment with the steering wheel 18. Rollers 21 and 22 are free turning idlers.

As seen in FIG. 7, the steering wheels 18 and 19 are alternatively moved to a position where the upper surface (FIG. 5) is above the plane of the rollers in the receiving section of the apparatus, or below these rollers. When steering wheel 18 is raised it will assume a position to engage the undersurface of an article fed to it by the belt 13, and the article will be directed toward the conveyor rollers 15 and will have its bottom surface engaged on the friction roller 22. Since the roller 22 turns freely the momentum of the article will cause it to assume an orientation 90° from its original orientation as it leaves the conveyor belt 13. In a similar manner, when the rocker arm of FIG. 7 elevates the steering wheel 19 it will engage the bottom surface of an article and direct it toward the conveyor rollers 14 so that it will travel over the friction roller 21 thereby being given an orientation 90° to its original orientation on the conveyor belt 13.

When the respective rollers 21 and 22 are adjusted to a position close to the separator member 28 they are effectively removed from the path of travel of the articles so that there is no article turning orientation and all articles will retain the original lengthwise orientation as they are delivered to the conveyor belt 13.

It can be seen in FIGS. 1 and 2 that a photocell 78 is fixed by a bracket 79 to the side member 23 for the conveyor rollers 14. The photocell 78 projects a light beam toward a reflecting mirror 77 mounted on the separator member 28 in a space adjacent to the frame 29 so as to intercept and reflect the light beam from the photocell 78. The light beam is broken by the passage of an article when the steering wheel 19 is elevated. The breaking of the light beam signals a control circuit to reverse the motor means 65 and move the rocker arm 61 to raise steering wheel 18 and retract steering wheel 19. A second photocell 81 is mounted on a bracket 82 so as to direct a light beam onto a reflecting mirror 80 carried on the side of separator 28 in a position to reflect the light beam back to the photocell 81. This second light beam is broken by passage of an article directed by the steering wheel 18 toward the conveyor rollers 15. The breaking of the light beam from photocell 81 actuates motor means 65 (FIG. 7) to reverse the positions of the steering wheels 18 and 19. A suitable control circuit can be devised without difficulty to receive signals from the respective photocells 78 and 81 so that the rocker arm 61 is rocked back and forth, thereby alternately having the steering wheels 18 and 19 direct articles to the respective conveyor rollers 14 and 15. Should the photocell 78 be disabled intentionally the steering wheel 19 will remain elevated and all articles will be directed into the conveyor rollers 14. When the cooperating friction roller 21 is placed so as to engage the undersurface of each article it will turn the article to an orientation 90° from the orientation it had on the conveyor belt 13. It is understood that when the photocell 81 is intentionally disabled the steering wheel 18 will become effective to direct all articles onto the conveyor rollers 15, as there will be no breaking of the light beam to signal the motor means 65 to reverse the position of steering wheels 18 and 19.

In the arrangement of the drive to the respective steering wheels 18 and 19 it is the intention to have these wheels rotate at such a speed that articles will be accelerated by wheel 18 into the conveyor rollers 15, and articles will be accelerated by wheel 19 into the conveyor rollers 14. As the articles move over the small friction rollers 21 or 22 a portion of the article will be lifted above the surface of the adjacent rollers so that the momentum of the articles, coupled with the angular orientation thereof, will cause the rear end of the article to swing forward so as to change the orientation by 90° from the entry orientation.

More specifically, let it be assumed that an article is fed by belt 13 over the dead plate 20 and onto the steering wheel 18 in an alignment with its lengthwise dimension pointed into the direction of movement off of belt 13. The angular setting of steering wheel 18 will therefore cause the article to veer to the right (FIG. 2) over certain of the unpowered rollers of group 17 and toward the powered rollers 15. When the bottom of the article moves over the free running roller 22 that portion of the article is prevented from moving in a straight line and therefore must follow substantially a projection of the plane of rotation of steering wheel 18 and the path dictated by the angular orientation of the roller 22. The steering wheel 18 rotates faster than any of the powered rollers 15 which gives that portion of the article an acceleration which throws or spins the rear portion of the article forwardly, and the roller 22 completes the spin of the article into its reoriented position by the time the driven rollers 15 assume complete support thereof. Since steering wheel 18 engages the outside margin of an article and turns it to the right (FIG. 2), the momentum imported to that side will cause the article to turn. Now, the roller 22 is free to turn and keep that side of the article from engaging the powered rollers 15, whereby the full effect of the spin generated in the article by the steering wheel 18 is available to reorient the article. The foregoing description applies equally to the accelerated rotation of steering wheel 19 and free running roller 21 which cause articles to reorient themselves when moving onto rollers 14. As pointed out above, if the articles are not to be alternately diverted to the conveyor rollers 14 and 15, the photocells 78 and 81 may be programmed to permit a group of articles to be continually directed into the conveyor rollers 14 or rollers 15.

What is claimed is:

1. In article conveying and orienting apparatus for articles moved from a common feed path selectively into either of a pair of separate paths, the improvement comprising: a feed conveyor defining a plane of article movement and operative to move articles in spaced apart relation along a path ending at a discharge end; a pair of article receiving roller conveyors defining planes of article movement and having article receiving ends adjacent each other and adjacent said feed conveyor discharge end, said pair of article receiving roller conveyors being on opposite sides of an axis substantially centered with said feed conveyor path; an article steering wheel located in the article receiving end of each of said article receiving roller conveyors, each steering wheel being oppositely angularly oriented and movable to have the periphery thereof project above the plane of article movement from said feed conveyor to an article receiving roller conveyor to engage and direct articles toward the opposite one of said article receiving roller conveyors and initiating a turning response in the articles; means operably mounting said steering wheels such that the periphery of only one at a time is above the plane of said paths of article conveyance for the purpose of engaging and directing the articles onto an article receiving roller conveyor; and means beyond each of said steering wheels in the direction of article movement and operably disposed in said pair of article receiving roller conveyors to be engaged by articles directed into said article receiving roller conveyors and continue a change in the turning response of such articles to change the orientation from that on said feed conveyor.

2. The apparatus of claim 1, wherein said steering wheels have a peripheral speed faster than said feed conveyor to accelerate each article, and said means to effect a change in the orientation of accelerated articles comprise freely rotatable rollers having axes of rotation at angles to the path of article movement in said separate paths.

3. The apparatus of claim 1, wherein said means beyond each of said steering wheels is adjustable between positions ineffective to change the orientation of articles and positions effective to do so.

4. The apparatus of claim 2, wherein said means beyond each of said steering wheels is movable to project above the plane of article movement whereby to elevate a portion of an article during accelerated movement and allow the momentum of the article free play to effect the change of orientation.

5. The apparatus of claim 2, wherein said freely rotatable rollers have axes of rotation at approximately 40° to the rollers in said article receiving roller conveyors, and said steering wheels have axes of rotation different from said first mentioned axes for said freely rotatable rollers.

* * * * *